US005761192A

United States Patent [19]
Hummel

[11] Patent Number: 5,761,192
[45] Date of Patent: Jun. 2, 1998

[54] METHOD AND ATM COMMUNICATION NETWORK FOR INTEGRATION OF AN ATM SWITCHING NODE TO BE CONFIGURED INTO AN ATM COMMUNICATION NETWORK

[75] Inventor: Heinrich Hummel, Erlenweg, Germany

[73] Assignee: Siemens Aktiengesellschaft, Munich, Germany

[21] Appl. No.: 587,992

[22] Filed: Jan. 17, 1996

[30] Foreign Application Priority Data

Nov. 9, 1995 [DE] Germany .................. 295 17 800.0

[51] Int. Cl.⁶ .................................................. H04L 12/26
[52] U.S. Cl. ........................ 370/254; 370/255; 370/257
[58] Field of Search ................................. 370/252, 254, 370/255, 395, 297

[56] References Cited

U.S. PATENT DOCUMENTS 5,546,540  8/1996  White ................................ 370/254
5,586,567  12/1996  Chatwani et al. ................. 370/254

FOREIGN PATENT DOCUMENTS 44 08 974.0  3/1994  Germany .
44 08 975.9  3/1994  Germany .
408032597  2/1996  Japan .

OTHER PUBLICATIONS

Asynchroner Transfer–Modus:Grundbaustein fur das Breitband–ISDN Teil 1: Prinzip.Nachrichtentech..Elektron..Berlin 42.1992.

Asynchroner Transfer–Modus:Grundbaustein fur das Breitband ISDN II:Netz und Dienste Elektron..Berlin 42 (1992) 3.

ATM Forum: Technical Committee PNNI Working Group/ SIG ATM Forum/95–0090–An Extension to Signalling of Smart PVPCs Proposal. Feb. 1995.

*Primary Examiner*—Melvin Marcelo
*Attorney, Agent, or Firm*—Hill & Simpson

[57] ABSTRACT

Integration of ATM switching nodes that have been placed in operation but are not yet addressable in ATM-signaling conforming fashion into an ATM communication network is achieved by communicating configuration messages to an ATM switching node which is a neighbor of the ATM switching node to be configured and forwarding from this neighbor to the ATM switching node to be configured. The property of an ATM switching node placed in operation is exploited such that, even if it does not yet have its own ATM address, it can receive data packets from a neighbor ATM switching node. The configuration messages are thus communicated via the ATM communication network itself to the ATM switching node to be configured.

19 Claims, 3 Drawing Sheets

METHOD AND ATM COMMUNICATION NETWORK FOR INTEGRATION OF AN ATM SWITCHING NODE TO BE CONFIGURED INTO AN ATM COMMUNICATION NETWORK

BACKGROUND OF THE INVENTION

ATM (Asynchronous Transfer Mode) communication networks are communication networks for the transmission of information in packeted cells having a fixed length independently of the type of the information and the bandwidth of the information. ATM communication networks form a uniform technical basis for traffic with the greatest variety of bit rates up into the gigabit range between the greatest variety of information sources and sinks. An ATM communication network is thereby composed of ATM switching nodes that are networked with one another and enable the connection of communication terminal equipment. Virtual paths and virtual channels between the communication terminal equipment are established via the ATM switching nodes; and the information to be transmitted—signaling and useful information—are asynchronously transmitted in cells having a length of 53 bytes.

A known interface for the transmission of signaling information is the private network node interface (PNNI) on whose protocol signaling messages such as call setup requests, the call setup confirmation (connect), and the clear down of a connection (release) are realized. The protocol for the PNNI interface thereby defines information elements for a setup message that contain the parameters for setting up a virtual connection. The principle of an ATM network and of the call setup are known from, among other things. "Asynchroner Transfer-Modus: Grundbaustein fuer das ISDN", in Nachrichtentechnik, Elektronik, Berlin 42, 1992, Nos. 2 and 3, pp. 63–66 and pp. 103–106.

An ATM communication network is constructed in that further ATM switching nodes are integrated step-by-step into the network and are networked to neighboring ATM connecting nodes. For that purpose, a new ATM switching node must be installed in circuit-oriented terms and must be connected via trunk lines to at least one further ATM switching node. Furthermore, this new ATM switching node must be programmed, the program systems necessary for functioning must be started, and an information base of the management of the ATM switching node must be installed.

This part of the incorporation of an ATM switching node occurs during the installation; however, the switching node identifier and its ATM address individually associated to the communication network must also be additionally communicated for the integration of this ATM switching node into the ATM communication network, i.e. the ATM switching node is configured.

These information are not always available during the circuit-oriented installation and initialization of the ATM switching node. A functional separation of the two procedures is also definitely desirable since the installation is usually implemented by a hardware supplier, and the initialization is implemented by the network operator, i.e. by two different parties. The communication of the configuration data for incorporation of the ATM switching node into the ATM communication network thus requires a second on site deadline and additional, new costs. This denotes an additional, significant economic outlay, particularly when the network comprises a great number of ATM switching nodes.

SUMMARY OF THE INVENTION

It is an object of the invention to design the integration of the ATM switching node in an ATM communication network to be more economical. This object is achieved by a method for integration of an ATM switching node to be configured that still cannot be addressed in ATM-signaling-conforming fashion into an ATM communication network which includes the following steps. The ATM communication network is provided with at least one ATM switching node connectable to a network manager. With the network manager, specific configuration messages for an ATM switching node to be configured are communicated to a neighboring switching node. With the neighboring switching node, the configuration messages are forwarded to the ATM switching node to be configured via a trunk line predetermined by the configuration messages. The configuration messages are received at the ATM switching node to be configured and a configuration is effected based on the received configuration messages.

The object is also achieved by an ATM communication network according to the invention having ATM switching nodes networked with one another and connected to communication terminal equipment. The ATM switching nodes have a program for configuration with assistance of configuration data embedded in configuration messages that are processed after reception of configuration messages intended for a respective ATM switching node. At least one of the ATM switching nodes is connected to a network manager having an additional program for receiving configuration messages from the network manager, and having a program for a through-connection of an ATM connection to an ATM switching node to be configured for the purpose of communicating configuration messages.

According to the invention, the communication of the configuration messages for integration of the ATM switching node that is to be configured and that cannot be addressed in conformity with ATM signaling into the ATM communication network should occur with the assistance of a network manager. The network manager should not be directly connected to the ATM switching node to be newly configured; rather, an ATM connection is produced with the assistance of a neighboring ATM switching node neighboring the ATM switching node to be configured, for which purpose at least one ATM switching node is connectable to the network manager.

The configuration messages are forwarded via a neighboring ATM switching node within the ATM communication network that can directly address the ATM switching node to be configured by selecting a trunk line to this ATM switching node. The configuration messages received by the ATM switching node to be configured serve it for complete integration into the ATM communication network.

As a result of the method of the invention or an ATM communication network fashioned in such a way, the integration of an initialized ATM communication node is possible without a renewed seeking of the ATM switching node and without making use of an external communication network (for example, Internet) by designational communication to this ATM switching node to be configured, this yielding substantial economic savings.

In the first of two alternative embodiments, the ATM switching node connectable to the network manager itself represents a neighbor of the ATM switching node to be configured. In this case, the configuration messages are communicated directly from the ATM switching node connectable to the network manager to the ATM switching node to be configured. The method of the invention can thus already be used when only a single ATM switching node has been configured and is operational and connectable to the network manager. All other ATM switching nodes can then be integrated into the ATM communication network with the method of the invention.

In the second instance, the ATM switching node connectable to the network manager is itself not a neighboring node of the ATM switching node to be configured. Here, the configuration messages are communicated from the ATM switching node connectable to the network manager on the basis of a neighbor ATM switching node neighboring the ATM switching node to be configured, whereby the neighbor ATM switching node forwards the configuration messages to the ATM switching node to be configuration messages to the ATM switching node to be configured. This advantageous development of the method of the invention enables the utilization of the functional ATM communication network for setting up a connection to the neighbor ATM switching node that through-connects the configuration messages to the ATM switching node to be configured. The problem of ATM-conforming addressing of the ATM switching node to be configured (that does not yet have its own ATM address) is solved in that the neighbor ATM switching node communicates the configuration messages without this address by direct selection of a trunk line to the ATM switching node to be configured.

The method of the invention is advantageously designed such that a signaling connection to the neighbor ATM switching node is set up by a call setup message to this ATM switching node, and corresponding information elements that enable an ATM-conforming through-connection of the configuration messages within the useful information connection to the ATM switching node to be configured are contained in this call setup message. Additionally, a corresponding answer back is initiated. The division into signaling call and connection for the transmission of the useful information (configuration data) makes it possible to separately handle a signaling call to the neighbor ATM switching node and the useful information call to the ATM switching node to be configured. Known ATM call protocols, for example on the basis of ATM form networking protocols, can be used for setting up these calls and no additional demands are made of the corresponding standards.

The trunk line from the neighbor ATM switching node to the ATM switching node to be configured is advantageously determined by a selector, for example a one-byte selector, within an ATM address of the neighbor ATM switching node associated to the communication network, whereby the private ATM address of the neighbor ATM switching node is transmitted in the call setup message. This selector selects a port of the neighbor ATM switching node that realizes a trunk line to the ATM switching node to be configured. After having been placed into operation, the ATM switching node to be configured is in a queuing condition and, without knowing from which trunk line the configuration messages arrive, it is in the position to receive and evaluate the incoming configuration messages even without a corresponding addressing in that it recognizes them based on a virtual channel identification to be defined.

The signaling of the transmission of the configuration messages is advantageously implemented by a private network node interface. The ATM Forum presentation of Rao Cherukuri and Juha Heinanen from 6–10 Feb. 1995, "An Extension to Signaling of Smart PVPC's Proposal", discloses that a "called party soft PVPC/PVCC" be defined in order to produce a prioritized connection or a prioritized path between two ATM switching nodes. This information element or an additional information element can, according to claim 11, be utilized in order to determine the addressing of the ATM switching node to be configured on the selected trunk line. The called party soft PVPC/PVCC can thereby identify both the port to be selected as well as the virtual channel/path identification to be selected for the useful information connection from the neighbor ATM switching node to the ATM switching node to be configured. This, for example, can occur in that elements of the called party soft PVPC/PVCC in a table present in the neighbor ATM switching node address both the correct port as well as the virtual channel/path identification.

An information element of a broadband low-level information (BB-LLi), for example, is used for the protocol to be employed for the useful information connection in case the protocol is not permanently set. The protocol is already permanently established for the ATM switching node to be configured in a queuing condition.

According to another advantageous development of the method of the invention, the neighbor ATM switching node undertakes the addressing of the ATM switching node to be configured since the virtual channel identification (VCI) with the value 16 and the virtual path identification (VPI) 0 are used on the trunk line between the two ATM switching nodes. By using the virtual channel identification 16, which is utilized in ATM communication networks for addressing communication terminal equipment, one avoids removing further values of possible virtual channel identifications from the limited supply of values. An additional implementation of the method of the invention thus becomes possible without additional standardization expense. However, it is also possible to use other, previously defined values for the virtual connection identification.

Further advantageous developments as well as an ATM communication network that is designed for the implementation of an integration of ATM switching nodes are also provided according to the invention. The expansion of existing ATM switching nodes by implementing the method of the invention can be achieved by simply attaching further programs, for example in the form of program objects.

The method and apparatus for the ATM communication network of the invention are set forth in greater detail below with reference to drawings.

DESCRIPTION OF THE PREFERRED EMBODIMENTS

Figure 1:
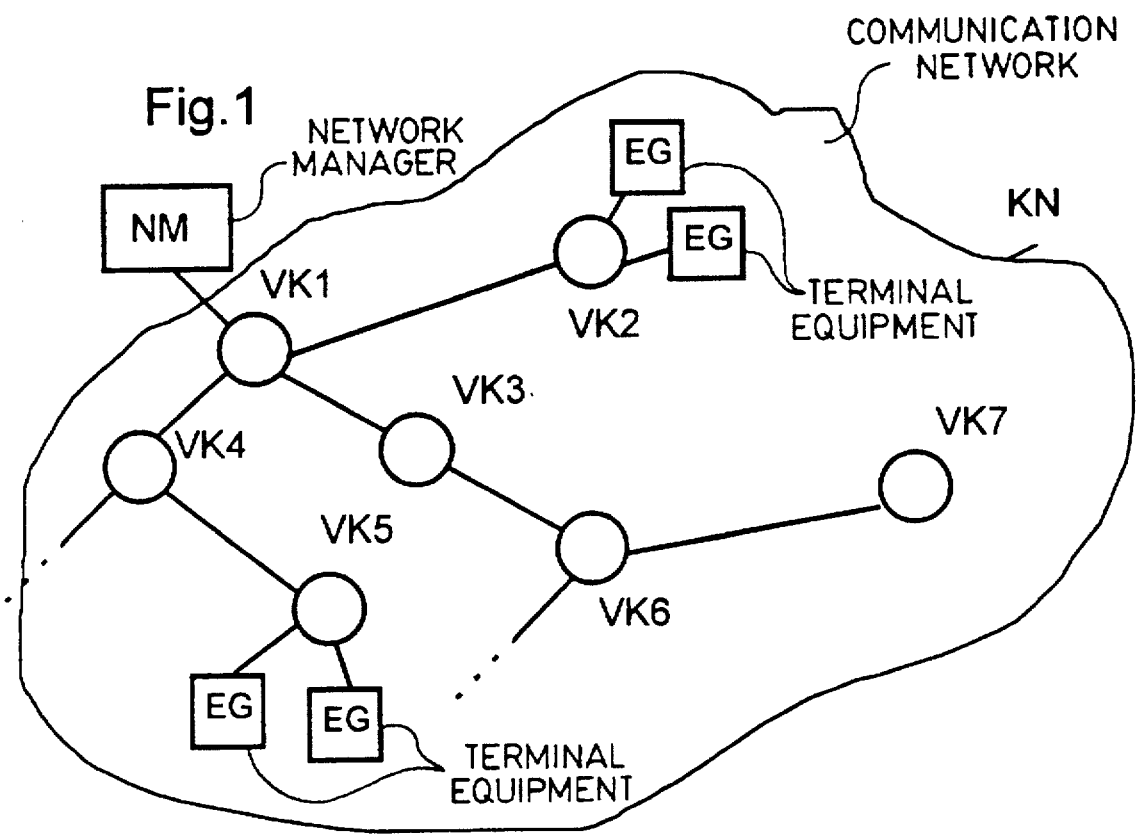
FIG. 1 is an ATM communication network having ATM communication nodes networked with one another and a connected network manager.

The ATM communication network KN of FIG. 1 is composed of ATM switching nodes VK1 . . . 7 that are networked with one another (i.e., connections exist between these ATM switching nodes VK1 ... 7; the first VK1 is connected to the second VK2, third VK3 and fourth VK4, the fourth VK4 is further connected to the fifth VK5, and the sixth VK6 is connected to the third VK3 and seventh VK7 ATM switching node VK1 ... 7). Communication terminal equipment EG can be connected thereto. The nature and design of the networking of the ATM switching nodes VK1 ... 7 is freely selectable, i.e. an ATM switching node VK1 ... 7 can comprise connections to one or more neighbor ATM switching nodes VK1 ... 7. The ATM switching nodes VK1 ... 7 need not be identically designed; they can be provided both for small capacities, i.e. a small number of connectable communication terminal equipment units EG, or can also be provided for an extremely large number of communication terminal equipment units EG.

Let it be assumed for the ATM communication network KN of the invention that a new ATM switching node VK7 is to be integrated into the ATM communication network KN. A trunk line to the neighbor switching node VK1, VK6 is already installed for this ATM switching node VK7 to be newly configured. A further ATM switching node to be newly configured neighbors the ATM switching node VK1. This ATM switching node VK1 is connectable to a network manager NM. This connection can be accomplished in that the network manager NM is installed in a personal computer PC and it is directly connected to a port, for example to a terminal for communication terminal equipment units EG, of the ATM switching node VK1 or in that an external communication network, for example Internet, is used.

The ATM switching nodes VK2, VK7 to be integrated into the ATM communication network KN have both been placed into operation, i.e. have been circuit-technically connected and are in queuing condition for incoming configuration messages ki after installation and initialization of the program technology. The protocol and the virtual channel identification of the anticipated configuration messages ki are thereby prescribed for the ATM switching nodes VK2, VK7 to be configured. The configuration messages ki, which contain particulars about the identification of the switching node and its communication-individual ATM address (referred to as a private ATM address in the PNNI protocol), should be communicated to these ATM switching nodes VK2, VK7 to be newly configured. They are communicated with the assistance of the ATM communication network KN.

The neighbor ATM switching nodes VK1 VK6-1 must be provided with additional programs in order to realize the integration of the ATM switching nodes VK2, VK7 to be newly configured according to the invention.

Figure 2:
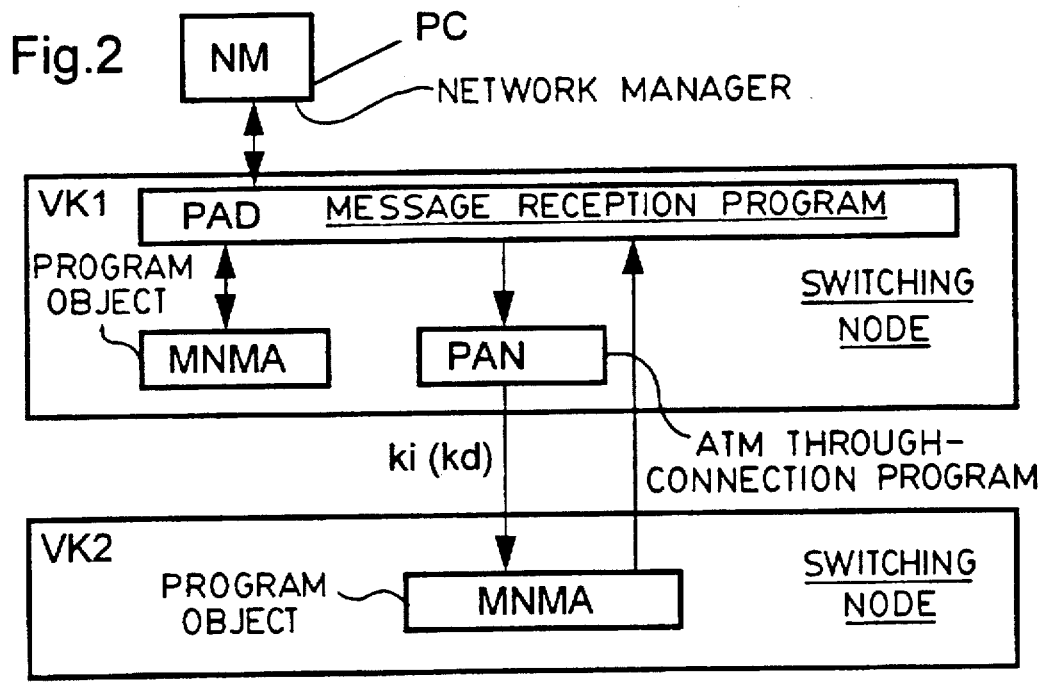
FIG. 2 is a schematic illustration of parts of the program structure of the ATM switching node participating in the integration and of the network manager when a neighbor ATM switching node is to be configured to the ATM switching node connectable to the network manager.

The configuration and integration of the ATM switching node VK2 into the ATM communication network KN shall be set forth with reference to FIG. 2. In addition to further program modules known from German Patent Application P 44 08 974.0 and German Patent P 44 08 975.9 each ATM switching node VK1 ... 7 contains programs MNMA (for example, as objects) for configuration with the assistance of configuration data kd embedded into configuration messages ki that are processed after the reception of configuration messages ki designed for the respective ATM switching nodes VK1 ... 7. These program objects MNMA are thus contained in the ATM switching nodes VK1 ... 7.

The ATM switching node VK1, which is connectable to the network manager NM, contains additional programs PAD for receiving configuration messages ki from the network manager NM. These programs PAD are also designed such that they can communicate and answer back (for example, connect and release messages) about the execution of the configuration to the network manager NM. The ATM switching node VK1 is configured itself in that the program MNMA for the configuration processes the configuration messages ki communicated from the network manager NM. For configuration of the added ATM switching node VK2, the ATM switching node VK1 contains additional programs PAN for the through-connection of an ATM connection to the neighboring ATM switching node VK2 for the purpose of communicating configuration messages ki. Particulars in the form of a selector or as part of a called party soft PVPC/PVCC are contained in the configuration messages ki received by the network manager NM that, for example, are intended as a call setup message for the neighbor ATM switching node VK2, these particulars being directed to that trunk line and that port via which configuration messages ki are to be transmitted from the ATM switching node VK1 to the ATM switching node VK2. The programs PAN for through-connection of an ATM connection can thus directly forward following configuration messages ki of the useful information connection wherein configuration data kd are contained to the ATM switching node VK2 to be configured.

In the ATM switching node VK2, these configuration data kd are received and serve the purpose of designing an information base for the management of the ATM switching node VK2 that was already previously initialized. When the configuration of the ATM switching node VK2 is ended, this is reported by the programs MNMA thereof for configuration via the programs PAD for the reception of configuration messages in the neighbor ATM switching node VK1 to the network manager NM (potentially release message for the clear down of the connection).

Figure 3:
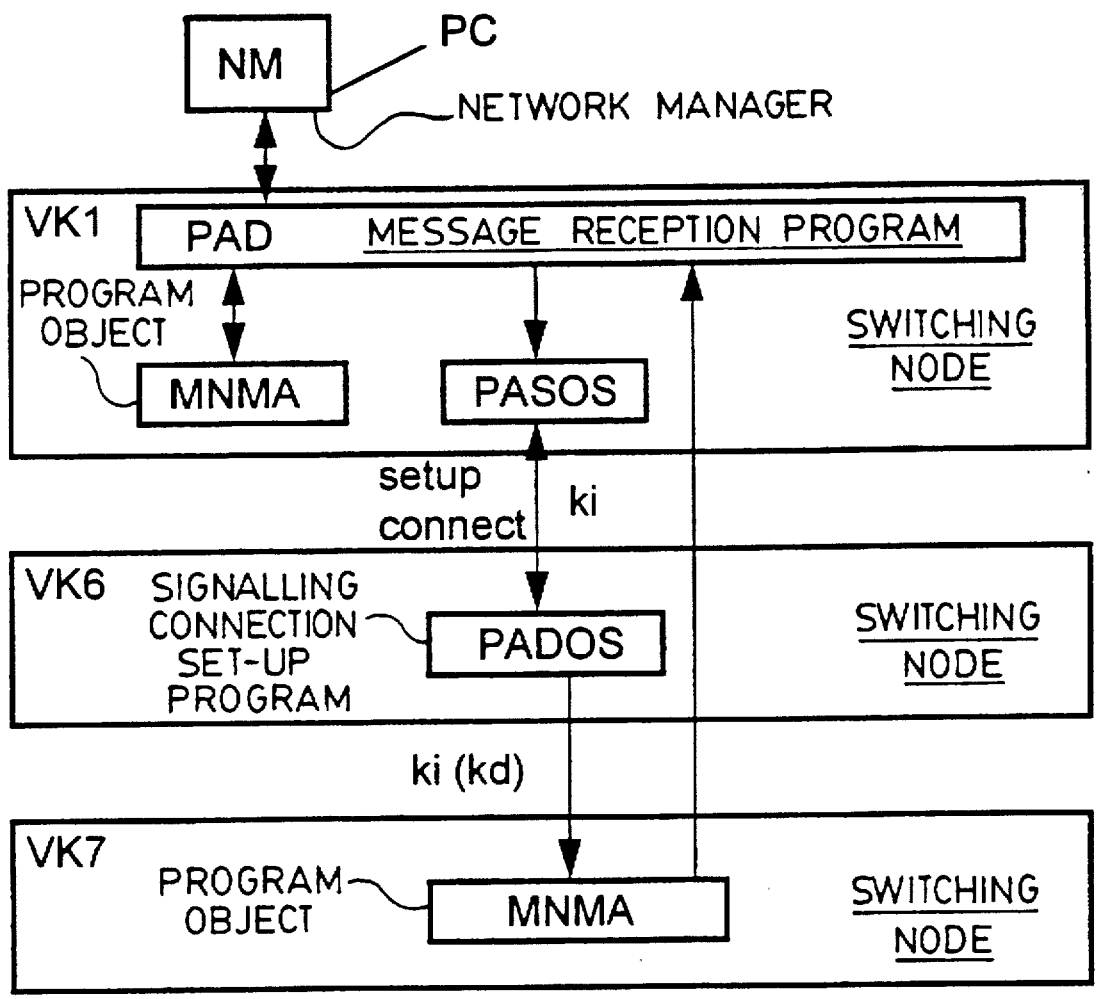
FIG. 3 is a schematic illustration of parts of the program structure of the ATM switching nodes participating in the integration of an ATM switching node and of the network manager when a remote ATM switching node is to be configured.

The configuration of the second ATM switching node VK7 to be newly configured is shown with reference to FIG. 3, whereby this ATM switching node VK7 does not neighbor the ATM switching node VK1 that can be directly connected to the network manager NM. The ATM switching node VK1 directly connectable to the network manager NM, as already explained with reference to FIG. 2, contains programs PAD for receiving configuration messages and programs MNMA for its own configuration. The connection between network manager NM and ATM switching node VK1 can be produced via a direct connection or via the Internet, whereby the network manager NM is advantageously installed in a personal computer PC.

The ATM switching node VK1 connectable to the network manager NM contains additional programs PADOS for setting up a signaling connection to a neighbor ATM switching node VK6 for the purpose of communicating configuration messages ki in a useful information connection for the ATM switching node VK7 to be configured that neighbors this neighbor ATM switching node VK6. Via the programs PAD for the reception of communication messages ki and the programs PADOS for setting up a signaling connection in the ATM switching node VK1, the configuration messages ki are thus communicated to additional programs PADOS for the through-connection of an ATM communication installed in the neighbor ATM switching node VK6.

A signaling call to the neighbor ATM switching node VK6 is set up by a call setup message SETUP, and the later setup of a useful information connection to the ATM switching node VK7 to be configured is prepared. A direct trunk line or a port to the ATM switching node VK7 to be configured is again selected by information elements (selector or called party soft PVPC/PVCC) in this setup message. The neighbor ATM switching node VK6 confirms the setup of the useful information connection with a confirmation message connect. In further configuration messages ki, configuration data kd are directly communicated via the useful information connection to the ATM switching node VK7 to be configured and the reception thereof after an implemented configuration is confirmed to the network manager NM via the ATM switching node VK1 connectable to the latter.

Figure 4:
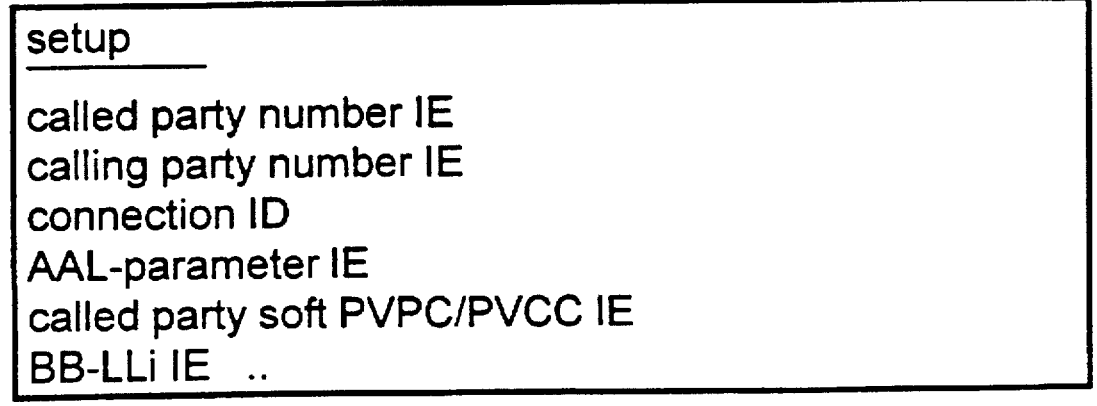
FIG. 4 is a schematic illustration of a call setup message according to the PNNI protocol and the information elements contained therein.

According to FIG. 4, the call setup message SETUP for setting up an ATM-conforming connection to the ATM switching node VK2, VK7 to be configured is, for example, a message corresponding to the private network node interface PNNI. This call setup message SETUP contains, for example, standardized information elements IE for the called party (called party number), the calling party (calling party number), a connection identification element (connection ID), a parameter for the ATM adaptation layer (AAL-ATM), as well as an additional information element for the called party that identifies a permanent, virtual connection in the form of a channel or of a path (called party soft PVPC/PVCC) and/or an information element of a broadband low level information (BB-LLi).

The information element IE of the called party contains the communication-network-associated (private) ATM address of the neighbor ATM switching node VK1, 6 neighboring the ATM switching node VK2, 7 to be configured. A selector that, for example, comprises only one byte selects the connection between the neighbor ATM switching node VK1, 6 and the ATM switching node VK2, 7 to be configured within this private ATM address. A port and, thus, a trunk line to the ATM switching node VK2, 7 to be configured is thus permanently set for the useful information transmission. The selection of the port can also occur with a port identifier within the called party soft PVPC/PVCC.

Figure 5:
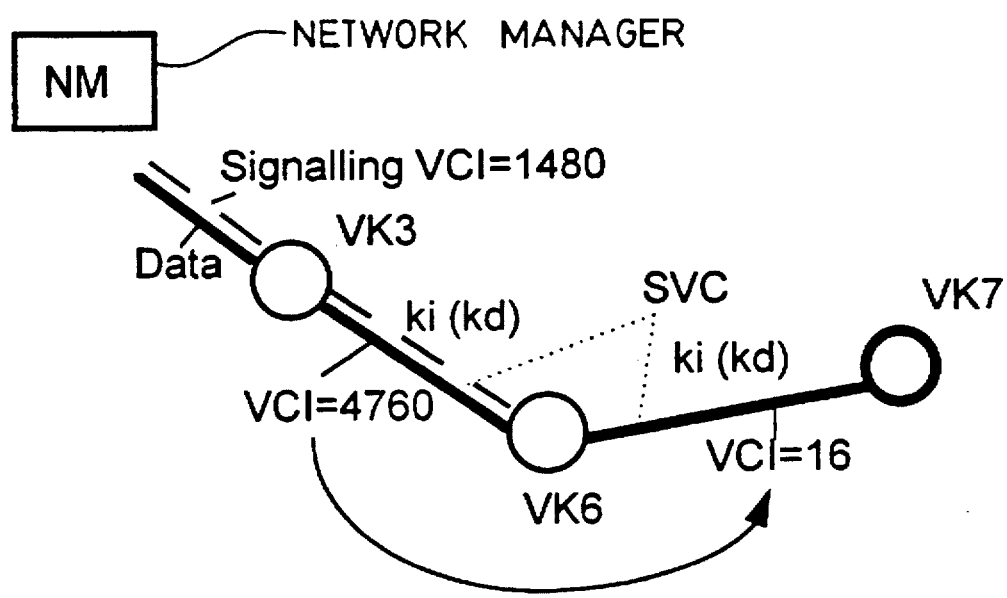
FIG. 5 shows the forwarding of the configuration data by an ATM switching node neighboring the ATM switching node to be configured.

FIG. 5 explains the through-connection of an ATM useful data connection by the neighbor ATM switching node VK6 to the ATM switching node VK7 to be configured. Here, for example, the ATM communication network KN according to FIG. 1 is referred to. The configuration messages ki are supplied to the neighbor ATM switching node VK6 by the network manager NM via ATM switching nodes VK1 and VK3. For this purpose, a switched virtual connection SVC is already set up as a signaling connection (VCI=1480) to the neighbor ATM switching node VK6.

Packeted cells of the useful information connection with the configuration messages ki in which the configuration data kd are embedded and that arrive at the neighbor ATM switching node VK6 arrive at this neighbor ATM switching node VK6 with a virtual channel identification VCI equal to, for example, 4760. The data protocol and the virtual connection identification VCI with which the configuration messages ki are to be communicated to the waiting ATM switching node VK7 to be configured can thus be predetermined in standard fashion and can also be communicated to the neighbor ATM switching node VK6 in the call setup message SETUP.

These information are contained, for example, in the additional information element of the called party (called party soft PVPC/PVCC) and the information element of the broadband low level information (BB-LLi). The neighbor ATM switching node VK6 modifies the virtual channel identification VCI that arrives with the value 4760 to, for example, the value 16. The ATM switching node VK7 to be configured receives the configuration data kd, correspondingly constructs its information base for the management of the ATM switching node VK7, and can thus be completely integrated into the ATM communication network KN.

The useful information connection to the ATM switching node VK6 that has just been newly configured can be maintained in order to enable later re-configurations or it is cleared down with the assistance of a release message (release).

Although various minor changes and modifications might be proposed by those skilled in the art, it will be understood that my wish is to include within the claims of the patent warranted hereon all such changes and modifications as reasonably come within my contribution to the art.

I claim as my invention:

1. A method for integration into an ATM communication network an ATM switching node to be configured that can still not be addressed in ATM-signaling-conforming fashion, comprising the steps of:

providing the ATM communication network with at least one neighboring ATM switching node connected to a network manager;

with the network manager, communicating to the neighboring ATM switching node specific configuration messages for the ATM switching node to be configured;

forwarding with the neighboring ATM switching node the configuration messages to the ATM switching node to be configured via a trunk line predetermined by the configuration messages; and receiving the configuration messages at the ATM switching node to be configured and effecting a configuration based on the received configuration messages.

2. A method according to claim 1 wherein the configuration messages are directly communicated to the ATM switching node to be configured from the ATM switching node connectable to the network manager that also represents the neighboring ATM switching node.

3. A method according to claim 1 wherein the configuration messages are communicated from the at least one ATM switching node connectable to the network manager to a neighboring ATM switching node within the ATM communication network by which the configuration messages are forwarded to the ATM switching node to be configured.

4. A method according to claim 3 wherein for forwarding the configuration messages a signaling connection from the ATM switching node connectable to the network manager is set up to the neighboring ATM switching node neighboring the ATM switching node to be configured in that a call setup message is communicated; and the neighboring ATM switching node undertakes an ATM-conforming through-connection of a useful information connection to the ATM switching node to be configured and an answer back results.

5. A method according to claim 1 wherein the network manager is realized in a personal computer connectable to an ATM switching node.

6. A method according to claim 1 wherein the connection between the network manager and the ATM switching node connectable thereto is produced via an external communication network.

7. A method according to claim 1 wherein said communicating of the configuration messages is implemented via a private network node interface.

8. A method according to claim 1 wherein answer backs of the ATM switching node to be configured or of the ATM switching nodes participating in the communication of the configuration messages are forwarded to the network manager.

9. A method according to claim 3 wherein the communication to the neighbor ATM switching node is set up with a call set up message as a switched virtual connection.

10. A method according to claim 3 wherein a trunk line from the neighboring ATM switching node to the ATM switching node to be configured is defined by a selector within a communication-net-associated ATM address of the neighbor ATM switching node belonging to a call setup message.

11. A method according to claim 9 wherein addressing of the ATM switching node to be configured is determined by an information element of a called party soft PVPC/PVCC in the call setup message.

12. A method according to claim 11 wherein the called party soft PVPC/PVCC contains particulars about trunk lines from the neighboring ATM switching node to the ATM switching node to be configured and about virtual channel identification to be set for a useful information connection.

13. A method according to claim 10 wherein a protocol to be employed for a useful information connection to the ATM switching node to be configured is defined by an information element of a broadband low level information in the call setup message.

14. A method according to claim 12 wherein the virtual channel identification for the useful information connection to be set for addressing the ATM switching node to be configured is set to a value 16 by the neighboring ATM switching node.

15. An ATM communication network wherein an ATM switching node to be configured that can still not be addressed in ATM-signaling-conforming fashion can be integrated into the ATM communication network, comprising:

the ATM communication network having at least one neighboring ATM switching node connected to a network manager;

the network manager communicating to the at least one neighboring ATM switching node specific configuration messages for the ATM switching node to be configured;

the neighboring ATM switching node forwarding the configuration messages to the ATM switching node to be configured via a trunk line predetermined by the configuration messages; and the ATM switching node to be configured receiving the configuration messages and effecting a configuration based on the received configuration messages.

16. An ATM communication network according to claim 15 wherein programs for setup of a signaling connection to a neighbor ATM switching node are designed such that the communication and later transmission of the configuration messages occurs via two separate virtual connections.

17. An ATM communication network according to claim 15 wherein the network manager is realized in a personal computer directly connected to the at least one ATM switching node.

18. An ATM communication network according to claim 15 wherein the connection between the network manager and the at least one ATM switching node connected thereto is provided via an external communication network.

19. An ATM communication network according to claim 15 wherein connections between ATM switching nodes are designed according to a private network node interface.

* * * * *